United States Patent

Harkenrider et al.

[15] 3,675,046
[45] July 4, 1972

[54] CONTROL CIRCUIT

[72] Inventors: Robert J. Harkenrider; John L. Moe, both of Winona, Mich.

[73] Assignee: Waynco, Inc., Winona, Minn.

[22] Filed: Sept. 28, 1970

[21] Appl. No.: 76,086

[52] U.S. Cl..........................307/252 B, 219/499, 307/310, 323/40
[51] Int. Cl.......................................................H03k 17/00
[58] Field of Search..............307/125, 130, 131, 117, 252 B, 307/252 T, 308, 310; 323/24, 40; 219/499, 490, 494, 497

[56] References Cited

UNITED STATES PATENTS

| | | | |
|---|---|---|---|
| 3,524,968 | 8/1970 | Walsh | 219/499 |
| 3,538,423 | 11/1970 | Goleniewski | 323/40 x |
| 3,486,042 | 12/1969 | Watrous | 307/252.21 |
| 3,235,711 | 2/1966 | Bergen et al. | 219/499 |
| 3,215,818 | 11/1965 | Deaton | 219/499 |
| 2,866,067 | 12/1958 | Dolan et al. | 219/499 |

*Primary Examiner*—J. V. Truhe
*Assistant Examiner*—L. A. Schutzman
*Attorney*—Richard J. Renk

[57] ABSTRACT

A circuit is provided in which an electrically conductive load being controlled is in one leg of a bridge with the load also acting as its own transducer. When power to the load is off, energy pulses are applied to the bridge to compare the operating condition of the load to the balance setting of the bridge. An unbalanced condition in the bridge is then used to initiate control action.

10 Claims, 1 Drawing Figure

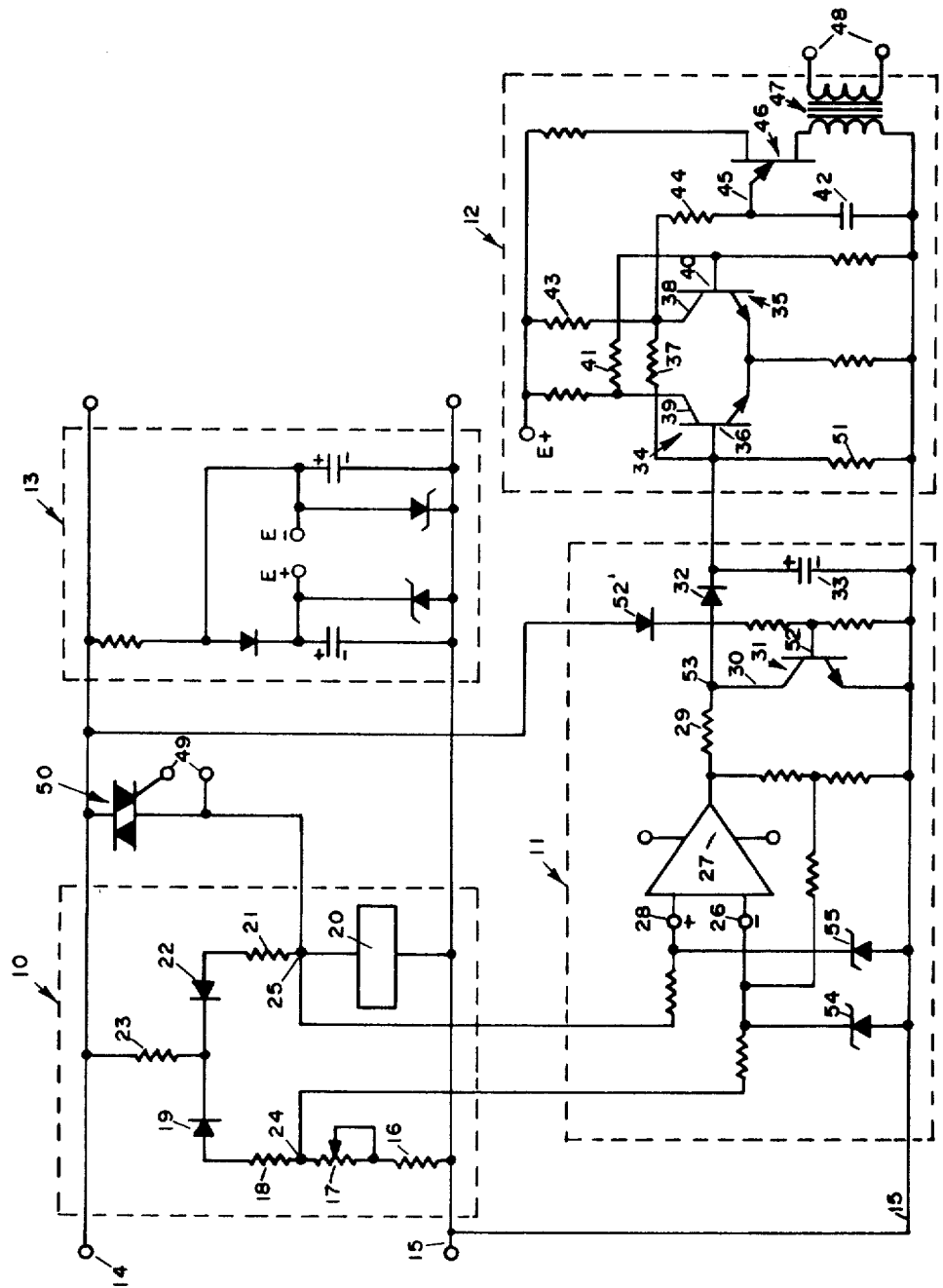
INVENTORS
ROBERT J. HARKENRIDER &
JOHN L. MOE
BY
Richard J. Lenk
ATTORNEY

CONTROL CIRCUIT

BACKGROUND OF INVENTION

In control circuits such as those used in temperature, pressure and humidity applications, it has been the practice to utilize a power circuit and sensor circuit. These controls ordinarily require separate sets of power leads and sensor leads. Because of space and environmental conditions, it is sometimes difficult and physically impossible to run the separate sensor leads to the load area to monitor the load being controlled.

SUMMARY OF INVENTION

The present invention eliminates the necessity of having a separate sensor to monitor the load being controlled such as temperature, humidity, pressure, etc. With the load in a leg of the bridge, at spaced intervals the bridge is pulsed. If the load has varied from the balance setting of the bridge, the output is fed to a comparator circuit. The comparator circuit compares the bridge output to a predetermined required output level and if necessary, energizes a switching means to apply power through a separate circuit to the load for a definite time interval. After the power to the load has been turned off again, the bridge and load are again pulsed to determine the load's condition.

DESCRIPTION OF DRAWINGS

FIG. 1 is a schematic diagram of one embodiment of the invention.

Referring to the drawings, general components of the circuit of the invention, blocked out in dotted lines, include a bridge 10, a converter circuit including a comparator circuit 11 and a switching circuit 12, and a power supply 13. While not necessarily limited thereto, the invention will be described as it relates to the control of the temperature of a heating load.

As shown in FIG. 1, an AC supply voltage is supplied via leads 14 and 15 to the power supply 13 and to the bridge 10. The bridge in one arm thereof includes a resistor 16, a variable potentiometer 17, a resistor 18 and a rectifying diode 19. In its opposite arm the bridge has a load 20 having either a negative or positive coefficient of resistance, a resistor 21 and a rectifying diode 22 tied to diode 19 in cathode-to-cathode relationship. Power is supplied to the bridge from a common line 15 tied to resistor 16 and load 20. On its opposite side power is supplied from line 14 via a resistor 23 to the tie point between the diodes 19 and 22.

The output of the bridge is fed via terminals 24 and 25 to the comparator circuit 11. The bridge output signal from terminals 24 and 25 resulting from an unbalanced condition indicates whether the temperature of the load 20 is higher or lower than the setting of the calibrated potentiometer 17.

In accordance with one feature of the invention, the bridge is pulsed at spaced intervals to determine its state of balance and thereby sense the condition of the load. In the present illustration, the bridge is pulsed and sensing occurs only when the AC line 15 is positive with respect to line 14 although other pulsing concepts may be used. For example, to determine bridge balance, assume that power is applied to lines 14 and 15, that load 20 has a positive coefficient of resistance, and that the load is below the desired temperature setting of the potentiometer 17. Under these conditions, when line 14 is positive with respect to line 15, no current will flow through the bridge as it will be blocked by diodes 19 and 22. Thus no sensing action will occur.

When line 15 becomes positive with respect to line 14, a current pulse will flow through both arms of the bridge and through their respective diodes 19 and 22. Because the load 20 is colder than the temperature referenced on potentiometer 17, its resistance will be lower than that of the potentiometer. Therefore, a larger voltage drop will appear across potentiometer 17 than across load 20. Bridge output terminal 24 will then be more negative than output terminal 25.

The negative voltage signal of terminal 24 is then applied to the negative input 26 of an amplifier 27 in the comparator circuit 11. Bridge output terminal 25 is coupled to the positive input 28 of the amplifier.

The amplifier 27 is selected such that with a negative input its output will be positive. The positive output is then coupled via resistor 29 to the collector 30 of a transistor 31, and thence through a diode 32 to charge a capacitor 33 tied to the common line 15. The greater the positive output from the amplifier, the greater will be the voltage build-up on capacitor 33. Transistor 31 serves in a synchronous clamping function when line 14 goes positive and will be described in detail later.

As described above, charging of capacitor 33 occurs when line 15 is positive, the bridge load is below the set-point of potentiometer 17 making the signal from the bridge to the amplifier 27 negative, and the amplifier output is positive.

The output from the comparator circuit 11 is then applied to the switching circuit 12. Specifically the voltage of capacitor 33 is applied to a flip-flop switch which includes transistors 34 and 35. In this arrangement capacitor 33 is tied to base 36 of transistor 34 which in turn is tied through a feedback resistor 37 to the collector 38 of transistor 35.

With the voltage of capacitor 33 at a sufficient predetermined positive value, transistor 34 will conduct and transistor 35 will be non-conducting. As transistor 34 conducts, its collector 39 which is linked to the $E^+$ voltage will assume a low-voltage state. Transistor 35 will thus be off since its base 40 will assume a low-voltage state by virtue of being tied through feedback resistor 41 to the $E^+$ supply and collector 39 of transistor 34. Under this condition, collector 38 of transistor 35 will rise to nearly the $E^+$ supply voltage.

Conduction of transistor 34 (with transistor 35 off) will allow a capacitor 42 to charge from $E^+$ via resistors 43 and 44. The latter resistors are tied at their junction with one another to collector 38 of transistor 35. The output of capacitor 42 is coupled to the emitter 45 of a unijunction transistor 46. When capacitor 42 reaches the peak voltage of the unijunction 46, it will turn on discharging the capacitor into a pulse transformer 47. The voltage developed in the secondary 48 of the pulse transformer is coupled to the gate 49 of a triac 50 which applies full AC line voltage across the load 20. The output of the triac in effect parallels or shorts-out the portion of the bridge in which the load is located.

Now with triac 50 placing full line voltage across the load 20, when line 14 goes positive with respect line 15, the bridge output will be positive. The output from amplifier 27 will then be negative and capacitor 33 will not be charging. Any charge previously accumulated on the capacitor is then slowly discharged into transistor 34, resistor 37 and another resistor 51 tying transistor base 36 to common. This keeps unijunction 46 oscillating and triac 50 "on" until capacitor 33 discharges below the critical voltage level of the unbalanced flip-flop. Whereupon, transistor 34 turns off and transistor 35 turns on thereby turning off unijunction 46 and triac 50.

With power off the load 20, bridge 10 will again be pulsed and sense the condition of the heater load when line 15 is positive. If the load is still below the temperature represented on the potentiometer 17, the complete cycle of charging capacitor 33 will repeat itself.

Reference is now made to the function of transistor 31. As will be noted in FIG. 1, its base 52 is coupled via a diode 52 to supply line 14. At the time line 14 is positive, base 52 will be positive causing transistor 31 to conduct and clamp the output of amplifier 27 from point 53 to common 15. This prevents amplified noise from adding any charge to capacitor 33 thereby improving the signal to noise ratio of the system. The second function of transistor 31 is to clamp the amplifier output to line 15 when line 14 is positive and triac 50 is conducting placing full AC supply on the load 20 and on the bridge output 25. Since bridge output 25 connects to the positive input 28 of amplifier 27, each time the load voltage goes positive, the amplifier output will go positive. Transistor 31 under this condition will clamp the amplifier output at point 53 to line 15 and prevent capacitor 33 from charging.

The input to the amplifier is protected during application of full supply voltage to the load by zener diodes 54 and 55.

Assume now that the load 20 is above the set-point temperature of potentiometer 17 and that the triac 50 is off. When line 14 is positive, the bridge will not sense as diodes 19 and 22 will perform their blocking function. When line 15 is positive and the load hotter than the potentiometer setting, the bridge output will be positive. The amplifier output will thus be negative diode 32 will prevent capacitor 33 from charging. This will keep transistor 34 and unijunction 46 off and consequently the power off the load 20.

As the load cools, the bridge 10 will be periodically pulsed on the negative half cycle of the AC line to sense the load condition. Upon cooling to below the potentiometer set-point, the bridge output will again go negative and provide a positive amplifier output. The switching circuit will then be triggered as capacitor 33 is charged and triac 50 will apply power to load 20. Cycling will continue modulating the load temperature slightly above and below the desired temperature. The fineness of control is adjusted by the amplifier gain and time-constant of capacitor 33 and resistors 37 and 51 and the equivalent input resistance of transistor 34 in its "on" state.

Another novel feature of the invention resides in the means of preventing excess currents from flowing in the bridge 10 when power is on the load 20. This is accomplished by the diodes 19 and 22 connected back to back with respect to one another at a common junction and in opposite arms of the bridge. Power dissipation in resistors 16, 18, 21 and potentiometer 17 is thus kept to levels which can be accommodated by standard low power resistors. The diodes 19 and 22 also serve another purpose in rectifying the currents in their respective bridge arms when the bridge is used for sensing thus providing a pulsating DC error signal to the amplifier.

While one embodiment has been shown, it of course is within the realm of the concepts of the invention to employ a switching device other than the triac and to use other comparator circuits than the amplifier type as well as other type switching circuits than the flip-flop-unijunction type. Different oscillating concepts may be employed such as the transistor astable multivibrator or transistor blocking types. Other converter means can also be utilized to translate the bridge output to the switching device. Similarly, the bridge pulsing may be done from a separate source or from a DC source separate from the power supply across the load, and the load power supply can also be DC or of the transformer variety. Likewise, while the load has been shown to be of the resistive heater variety, other loads could be substituted where their impedance to current flow would vary with their operating state of condition such as would be involved with pressure and humidity. Also, the same concepts can be applied to controls of more than one mode such as encountered heating and cooling requirements.

We claim:

1. A circuit comprising, a power source, a bridge having an input and an output with the input connected to said power source, said bridge being adapted to sense an unbalance in its condition at pulsed intervals, a load in one leg of said bridge having a measureable coefficient of resistance and having one side thereof coupled to said power source, a switching device coupling the other side of said power source to the opposite side of said load, an amplifier having an input and an output with the input being coupled to said bridge output, a charging circuit coupled to the output of said amplifier, means for limiting the charging of said charging circuit to the periods when said bridge is receiving sensing pulses, said means also acting to disable the output of said amplifier at a predetermined polarity of said power source, and means coupling the output of said charging circuit to said switching device to activate said switching device when said charging circuit reaches a predetermined voltage level and to apply power to said load and to de-energize said switching device when said charging circuit voltage reaches another pre-determined level.

2. A circuit as claimed in claim 1 wherein a flip-flop switch is coupled to the output of said charging circuit.

3. A circuit as claimed in claim 1 wherein an oscillator means is coupled to said flip-flop and is energized when said flip-flop is in one of its states of condition.

4. A circuit as claimed in claim 3 wherein said oscillator means includes a unijunction transistor.

5. A circuit as claimed in claim 4 wherein the output of said unijunction pulses a transformer, and wherein the output of said transformer is coupled to the input of said switching device.

6. A circuit as claimed in claim 5 wherein said switching device is a triac.

7. A circuit as claimed in claim 1 wherein an AC power supply is provided and said bridge is pulsed on half cycles of said AC supply.

8. A circuit as claimed in claim 1 wherein said means for disabling said amplifier output includes a transistor having its output coupled across the amplifier output and its base coupled to an AC supply source.

9. A circuit as claimed in claim 1 wherein the bridge has two rectifying elements connected in cathode to cathode relationship with respect to one another in adjacent arms of the bridge.

10. A circuit comprising, an AC power source, a bridge having an input and an output, a load in one leg of said bridge, a switching device having an input and an output with the output of said switching device coupling said power source to said load to in effect by pass said bridge, means for pulsing said bridge and said load at spaced intervals to determine the balance of said bridge and thereby the condition of said load, converter means between the output of said bridge and the input of said switching device to convert the output of said bridge to a signal when said bridge reaches a predetermined condition to energize said switching device and apply power to said load, said converter means including means capable of maintaining said switching device energized independently of said pulsing means so as to apply power to said load continuously for a full cycle or more of said AC power source.

* * * * *